US009706048B2

(12) United States Patent
Russell

(10) Patent No.: US 9,706,048 B2
(45) Date of Patent: Jul. 11, 2017

(54) METHODS, SYSTEMS, AND COMPUTER READABLE MEDIA FOR NUISANCE CALL MANAGEMENT

(71) Applicant: Oracle International Corporation, Redwood Shores, CA (US)

(72) Inventor: Travis Earl Russell, Clayton, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/960,322

(22) Filed: Dec. 4, 2015

(65) Prior Publication Data

US 2017/0163803 A1  Jun. 8, 2017

(51) Int. Cl.
*H04M 3/42* (2006.01)
*H04M 3/436* (2006.01)
*H04L 29/06* (2006.01)

(52) U.S. Cl.
CPC ........ *H04M 3/436* (2013.01); *H04L 65/1016* (2013.01); *H04L 65/1076* (2013.01); *H04M 3/42059* (2013.01)

(58) Field of Classification Search
CPC .............. H04M 3/436; H04M 3/42059; H04L 65/1016; H04L 65/1076
See application file for complete search history.

(56) References Cited

U.S. PATENT DOCUMENTS

| | | | |
|---|---|---|---|
| 6,819,932 B2 | 11/2004 | Allison et al. | |
| 7,231,029 B1* | 6/2007 | Kirkpatrick | H04M 3/436 379/210.02 |
| 7,283,969 B1 | 10/2007 | Marsico et al. | |
| 8,826,422 B2 | 9/2014 | Russell | |
| 2002/0085700 A1* | 7/2002 | Metcalf | H04M 3/436 379/210.01 |
| 2004/0213396 A1* | 10/2004 | MacNamara | H04M 3/436 379/210.02 |
| 2010/0172482 A1* | 7/2010 | Fotta | H04M 3/436 379/207.02 |
| 2011/0026702 A1* | 2/2011 | Bot | H04M 3/4228 379/210.02 |
| 2016/0029188 A1* | 1/2016 | Joels | H04W 4/16 455/414.1 |
| 2016/0036991 A1* | 2/2016 | Brewer | H04L 65/1076 370/356 |

* cited by examiner

*Primary Examiner* — Ajit Patel
(74) *Attorney, Agent, or Firm* — Jenkins, Wilson, Taylor & Hunt, P.A.

(57) ABSTRACT

Methods, systems, and computer readable media for nuisance call management. In one example, a method includes receiving, at a telecommunications signaling computer system for routing telecommunications signaling messages in a core network of a telecommunications signaling network, a message from a subscriber's user equipment (UE) indicating that the subscriber has flagged a first call as a nuisance call. The method includes storing, in a subscriber-level nuisance call database, an association between a calling party identifier for the calling party and a subscriber identifier for the subscriber. The method includes, in response to a second call from the calling party to the subscriber, blocking, at the telecommunications signaling computer system, the second call using the association between the calling party identifier and the subscriber identifier in the subscriber-level nuisance call database.

19 Claims, 4 Drawing Sheets

US 9,706,048 B2

METHODS, SYSTEMS, AND COMPUTER READABLE MEDIA FOR NUISANCE CALL MANAGEMENT

TECHNICAL FIELD

The subject matter described herein relates generally to managing nuisance calls. More particularly, the subject matter described herein relates to methods, systems, and computer readable media for identifying and blocking nuisance calls at the network core of a telecommunications network.

BACKGROUND

Subscribers have been expressing concern for many years about calls that are generated by automatic dialers (commonly referred to as "robocalls"). These calls, and some other telemarketing calls, have become such a problem that the Federal Communications Commission (FCC) in the United States has altered previous rulings to now allow service providers to block calls that subscribers do not wish to receive. Current applications to block nuisance calls have not been effective because there is no existing solution to automatically identify calls generated by automated dialers and other nuisance callers.

For example, some current applications to block nuisance calls rely on a simultaneous ring feature. A third party computer system external to the core network is configured to receive the simultaneous ring, identify a call as a nuisance call, and then terminate the call. Such applications may be complicated for subscribers to configure, may not completely block the call from ringing the subscriber's phone, and lack access to certain kinds of data indicative of nuisance calls. Such applications may be limited to a single user view, where each user has the ability to block numbers significant to the user. Also, many of those applications are voice over internet protocol (VoIP) solutions and cannot be used by wireless or fixed line subscribers.

Accordingly, in light of these difficulties, there exists a need for methods, systems, and computer readable media for identifying and blocking nuisance calls at the network core of a telecommunications network.

SUMMARY

The subject matter described herein relates to methods, systems, and computer readable media for identifying and blocking nuisance calls at the network core of a telecommunications network. By capturing signaling from the control plane of the telecommunications network, and supplying certain information to a communications analytics computer system, a computer system in the core network can identify calls as potential nuisance calls and provide a mechanism for subscriber-initiated configuration. The computer system can block calls in the core network based on a subscriber's input and, in some cases, using characteristics "learned" by analytics based on patterns and inputs from subscribers. The resulting identification and blocking can be a more effective solution for managing nuisance calls than using external applications where features such as simultaneous ring are required.

In some examples, a method includes routing, at a telecommunications signaling computer system for routing telecommunications signaling messages in a core network of a telecommunications signaling network, a first call from a calling party to user equipment (UE) of a subscriber. The method includes receiving, at the telecommunications signaling computer system, a message from a subscriber's user equipment (UE) indicating that the subscriber has flagged a first call as a nuisance call. The method includes storing, in a subscriber-level nuisance call database, an association between a calling party identifier for the calling party and a subscriber identifier for the subscriber. The method includes, in response to a second call from the calling party to the subscriber, blocking, at the telecommunications signaling computer system, the second call using the association between the calling party identifier and the subscriber identifier in the subscriber-level nuisance call database.

In some examples, the method includes supplying the calling party identifier to a communications analytics computer system that stores, as a result of executing a nuisance call analytics routine using the calling party identifier, the calling party identifier in a network-level nuisance call database; and blocking a plurality of calls from the calling party to a plurality of other subscribers using the network-level nuisance call database. Supplying the calling party identifier to the communications analytics computer system can include supplying the subscriber identifier to the communications analytics computer system so that the communications analytics computer system determines to store the calling party identifier in the network-level nuisance call database based on both a count of a number of subscribers flagging calls from the calling party as nuisance calls and a positive result from executing a nuisance call pattern matching routine.

In some examples, the method includes receiving, at the telecommunications signaling computer system, a message from the UE indicating that the subscriber has retracted the flag of the first call and, in response, removing the association between the calling party identifier for the calling party and the subscriber identifier for the subscriber from the subscriber-level nuisance call database. In some examples, the first call is an IP multimedia system (IMS) call and the telecommunications signaling computer system is a session border controller (SBC). Supplying the calling party identifier to a communications analytics computer system can include using an IMS malicious communication identification (MCID) service.

In some examples, the first call is a wireless call and the UE is a mobile phone, and wherein routing the first call comprises using one or more of mobile application part (MAP), Diameter, and voice over long term evolution (VoLTE). Receiving the message from the UE indicating that the subscriber has flagged the first call as a nuisance call can include receiving the message from a mobile application executing on the mobile phone that prompts the subscriber with an option to flag a call as a nuisance call during the call or within a threshold amount of time after the call terminates.

Blocking the second call can include sending a text message to the mobile phone notifying the subscriber that the second call is being blocked. Blocking the second call can include sending a cause code to the calling party indicating why the call is not being routed.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by one or more processors of a computer cause the computer to perform operations.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
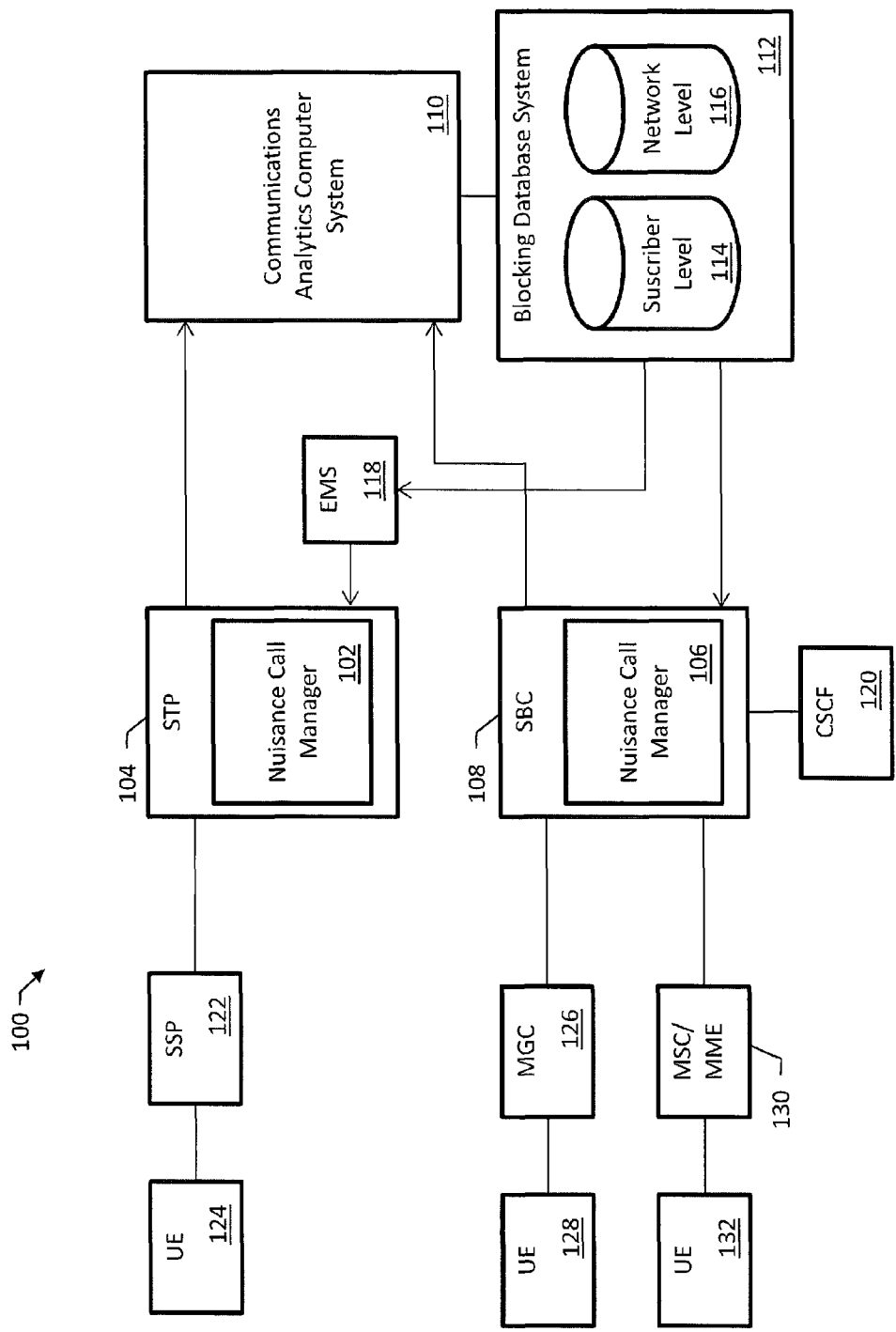
FIG. 1 is a block diagram of an example telecommunications network.

FIG. 1 is a block diagram of an example telecommunications network 100. Network 100 includes a nuisance call manager 102 implemented at a signal transfer point (STP) 104 for managing nuisance calls made using the public switched telephone network (PSTN) using signaling system 7 (SS7). Network 100 also includes a nuisance call manager 106 implemented at a session border controller (SBC) 108 for managing nuisance calls made using an IP multimedia system (IMS) and/or wireless calls made using mobile application part (MAP), Diameter, and voice over long term evolution (VoLTE).

For purposes of illustration, network 100 includes both nuisance call manager 102 and nuisance call manager 106, but in some examples, network 100 could include only one or the other. Moreover, although nuisance call managers 102 and 106 are shown as being implemented at STP 104 and SBC 108, nuisance call managers 102 and 106 can be implemented at any appropriate telecommunications signaling computer system.

STP 104 is a router, implemented as a system of one or more computers, that relays SS7 messages. For example, STP 104 can relay SS7 message between signaling end points (SEPs) and other STPs. Examples of SEPs include service switching points (SSPs) and service control points (SCPs). STP 104 can route SS7 messages based on, e.g., address fields of the SS7 messages.

SBC 108 is a system of one or more computers configured, by virtue of appropriate programming, to control signaling and media streams used in setting up, conducting, and tearing down telephone calls and other types of media communications. For example, SBC 108 can control voice over internet protocol (VoIP) calls. SBC 108 can be deployed, in some cases, on a border between two service provider networks in a peering environment, or between a service provider's access network and a backbone network to provide service the service provider's customers.

Nuisance call managers 102 and 106 are configured to identify nuisance calls by receiving messages from user equipment (UE), e.g., UEs 124, 128, and 132, indicating that subscribers have flagged calls as nuisance calls. Nuisance call managers 102 and 106 can add calling party identifiers to a blocking database system 112.

UEs 124, 128, and 132 can be any appropriate type of user equipment. For example, UEs 124, 128, and 132 can be smart phones, VoIP phones, or conventional PSTN phones. In some cases, UEs 124, 128, and 132 can be other types of computer equipment, e.g., a laptop or personal computer with a microphone and a speaker.

In operation, STP 104 routes a first call from a calling party to UE 124 by way of service switching point (SSP) 122. The subscriber uses UE 124, or another user computer device, to send a message to STP 104 indicating that the subscriber has flagged the first call as a nuisance call.

For example, the subscriber can enter a specific key combination on UE 124. In another example, the subscriber uses a specific key combination on UE 124 to activate a caller identification feature and get the calling party's number. Then the subscriber can use a personal computer to send the message to blocking database system 112 with the calling party's number to indicate that the subscriber considers the call from the calling party a nuisance call. For example, the subscriber can access a graphical user interface (GUI) provided by or for blocking database system 112 that would allow the subscriber to enter numbers at will, adding to their own personal partition. STP 104 can then act as an enforcement point based on guidance from blocking database system 112.

Nuisance call manager 102 stores, in a subscriber-level nuisance call database 114, an association between a calling party identifier for the calling party and a subscriber identifier for the subscriber. For example, nuisance call manager 102 can add the calling party's number to a block list for the subscriber. The subscriber may have a certain number of available spaces on the subscriber's block list, e.g., as part of service contract with a network operator. Limiting the number of available spaces on a subscriber's block list can reduce the computational overhead associated with checking the subscriber's block list each time a call is placed for the subscriber.

After nuisance call manager 102 stores the association in subscriber-level nuisance call database 114, the calling party makes a second call to UE 124. In response to the second call from the calling party to UE 124, nuisance call manager 102 accesses subscriber-level nuisance call database 114, e.g., by way of element management system (EMS) 118. Nuisance call manager 102 finds the association between the calling party identifier and the subscriber identifier in subscriber-level nuisance call database 114. Nuisance call manager 102 causes STP 104 to block the second call as a result of finding the association between the calling party identifier and the subscriber identifier in subscriber-level nuisance call database 114.

In some examples, nuisance call manager 102 does not query subscriber-level nuisance call database 114. Instead, subscriber-level nuisance call database 114 is configured to send nuisance call manager 102 a list of numbers to enter into a black list specific to nuisance call manager 102. Both SBC 108 and STP 104 can be configured with black list capabilities, but the numbers are entered based on entries from blocking database system 112. Blocking database system 112 can then provision STP 104 and/or SBC 108 with the new numbers to be blocked. This can be useful, e.g., to avoid reconfiguring STP 104 or SBC 108 with a query capability.

SBC 108 can operate similarly to STP 104 in blocking nuisance calls. In operation, SBC 108 routes a first call from a calling party to UE 128, e.g., by way of media gateway controller (MGC) 126. Typically, MGC 126 does not route the actual IP slice. MGC 126 is a signaling element that manages the various media gateways (MGs) in the network. MGC 126 communicates with the MG to determine where the call is to be routed, and ensures that the right IP slice is assigned for the session. The call is then routed from the MG to SBC 108. The SBC call block feature is then checked before routing the call to determine if there is an entry for the calling party number.

In another example, SBC 108 routes the first call to UE 132 by way of mobile switching center (MSC) or mobility management entity (MME). The subscriber uses UE 128, or another user computer device, to send a message to SBC 108 indicating that the subscriber has flagged the call as a nuisance call. For example, the subscriber can enter a specific key combination on UE 128, or press a dedicated button on UE 128 for identifying nuisance calls, which causes UE 128 to send the message to blocking database system 112. For example, blocking database system 112 can implement a function in front of the database to receive user-generated messages and manage those sessions, which would then send the data (e.g., calling number) to subscriber-level nuisance calling database 114. SBC 108 can use the signaling information for establishing the call to determine the calling party's calling party identifier.

Nuisance call manager 106 stores, in subscriber-level nuisance call database 114, an association between a calling party identifier for the calling party and a subscriber identifier for the subscriber. After nuisance call manager 106 stores the association in subscriber-level nuisance call database 114, the calling party makes a second call to UE 128.

In response to the second call from the calling party to UE 128, nuisance call manager 106 accesses subscriber-level nuisance call database 114. Nuisance call manager 106 finds the association between the calling party identifier and the subscriber identifier in subscriber-level nuisance call database 114. Nuisance call manager 106 causes SBC 108 to block the second call as a result of nuisance call manager 106 finding the association between the calling party identifier and the subscriber identifier in subscriber-level nuisance call database 114.

In some examples, SBC 108 does not query subscriber-level nuisance call database 114. Instead, SBC 108 is already provisioned with the calling party to block. This can be useful, e.g., where it would delay call processing to have SBC 108 query the database to determine if the call can be routed. The call volume could be prohibitive in some cases.

SBC 108 can operate in communication with a call session control function (CSCF) 120. CSCF 120 can be configured to process SIP signaling packets in the IMS. For example, CSCF 120 can implement a serving-CSCF, which can be the central node of the signaling plane and can perform session control and SIP routing. CSCF 120 can use Diameter interfaces to, e.g., a home subscriber server (HSS) to download subscriber information.

Network 100 includes a communications analytics computer system 110. Communications analytics computer system 110 is configured, by virtue of appropriate programming, to execute an analytics routine to identify nuisance calls based on nuisance calls supplied by subscribers by way of nuisance call managers 102 and 106. Communications analytics computer system 110 can store, as a result of executing a nuisance call analytics routine using a calling party identifier, the calling party identifier in a network-level nuisance call database 116. Nuisance call managers 102 and 106 can then block calls from the calling party to other subscribers using network-level nuisance call database 116.

In some examples, call signaling information is copied to communications analytics computer system 110 in response to a subscriber flagging a call as a nuisance call, i.e., in addition to provisioning STP 104 or SBC 108 to block the calling party for that particular subscriber. Such copying can be carried out using an existing feature of STP 104 or SBC 108. This allows calls to be routed but also entered into communications analytics computer system 110. The call can then be routed in real-time. If the call matches criteria determined by communications analytics computer system 110, the calling party number is entered into network-level nuisance call database 116 and then provisioned into STP 104 and SBC 108 for call blocking.

In some examples, communications analytics computer system 110 is configured to perform real-time analytics. For example, a call can first by analyzed in real-time or near real-time, and then a determination can be made using policy as to whether or not the call can be routed. Then, a determination is made as to whether or not the calling party information should be added to network-level nuisance call database 116 for future blocking.

Network-level nuisance call blocking can provide one or more of various advantages to the network. For example, network-level nuisance call blocking can increase customer satisfaction as a result of subscribers not receiving nuisance calls and in some cases having nuisance calls blocked without having to initially flag a nuisance call. In another example, network-level nuisance call blocking can improve the technical operation of the network by preventing nuisance calling from consuming computing resources in the network.

To illustrate the operation of either nuisance manager 102 or 106, consider the following three domains where nuisance management is potentially useful: one, for IMS terminated calls; two, for PSTN terminated calls using SS7; and three, for wireless terminated calls using one or more of mobile application part (MAP), Diameter, and voice over long term evolution (VoLTE).

In the case where the calls is an IMS terminated call, the nuisance manager can use a malicious communications identification (MCID) service to supply data, e.g., calling party identifiers, to communications analytics computer system 110. Communications analytics computer system 110 can then send data, e.g., a black list of calling party identifiers, to SBC 108 to block traffic. SBC 108 can sent notification to the subscriber by text message, e.g., short message service (SMS), that a call is being blocked. SBC 108 can send a cause code to a blocked calling party identifying why the call is not being routed.

MCID allows users to initiate a sequence of events when they receive calls deemed to be of malicious intent. The user who receives the nuisance call can invoke the MCID feature by using a softkey or feature button while the user is connected to the call. An MCID service allows a service provider to trace the identity information of the source of an incoming communication on request of the destination user. An MCID service will, in general, store session related information of incoming communications independent of the service requested. The following communication information can be registered:

destination party identity information;
originating party identity information; and
local time and date of the invocation in the network serving the called user The communication information is generally not made available to the terminal equipment under control of the called user or the originating user. The communication information is stored at a location under the control of the network operator.

If MCID is not implemented in network 100, or if a call bypasses the MCID service, then the subscriber can access a portal with an option of adding the calling party number to the subscriber's nuisance call list. The portal can be implemented as a web service that provides a graphical user interface (GUI) to authenticated subscribers to add and remove phone numbers from the subscriber's nuisance call list.

For example, a session initiation protocol (SIP) phone can be configured, by virtue of appropriate programming, to flag calls as nuisance calls. A call can be routed through SBC 108, and SBC 108 can determine if the call should be routed to the SIP phone. If the call is routed to the SIP phone, then the SIP phone has the option of answering the call or flagging the call. SBC 108 can send a SIP BYE message when it blocks a call.

In the case where a call is a PSTN terminated call using SS7, the call can be routed using ISDN User Part (ISUP). ISUP is a part of the SS7 system which can be used to set up telephone calls in the PSTN to exchange status information for, and permit management of, available communication circuits. STP 104 captures the ISUP messaging and supplies calling party information to communications analytics computer system 110. Communications analytics computer system 110 can populate a subscriber's nuisance call list on STP 104, e.g., using EMS 118 as an interface. Nuisance call manager 102 can include a function, built on STP 104, that blocks calls based on the calling party and the called party. EMS 118 can be used for provisioning STP 104 with new numbers to block. Blocking database system 112 can push new numbers to EMS 118, which then provisions STP 104. Using EMS 118 avoids the need to build a database query function on STP 104.

In the case that the subscriber is using a non-smart phone, the subscriber may be unable to provide feedback. In some examples, the subscriber can access a portal with an option of adding the calling party number to the subscriber's nuisance call list.

For example, the subscriber may be able to use the subscriber's personal computer to direct a web browser to the portal, which can be a web site hosted by the network operator. The subscriber can authenticate to the portal, e.g., by supplying a user name and password, and then use the portal to add the calling party number to the subscriber's nuisance call list. The subscriber may have to use a caller-ID feature to obtain the calling party's number, or, in some cases, the subscriber may be able to view a call history in the portal to specify the calling party that should be added to the subscriber's nuisance call list.

In some examples, the subscriber can flag the call as a nuisance call using a predetermined sequence, e.g., by dialing *99 or another appropriate code. Since an SS7 switch may not have a query mechanism for accessing blocking database system 112, STP 104 may need to be configured to perform the blocking operation. Although the system can be implemented with query functions at STP 104 and/or SBC 108, such query functions can delay call processing and therefore STP 104 and SBC 108 are typically provisioned with calling party numbers to block to avoid querying and the associated call processing delays.

In the case where the call is a wireless terminated call, the call can be routed using one or more of mobile application part (MAP), Diameter, ISUP, and voice over long term evolution (VoLTE). The call is received by the subscriber on a mobile phone, and the subscriber flags the call as a nuisance call. The subscriber can flag the call using an application on the mobile phone. When the call is received, the subscriber can be given the option to block the calling number before and after the call is complete. The call can be blocked on both the device, e.g., in case the subscriber is roaming and the home network is not sharing blocked call information, and also in network 100.

When the subscriber flags the call as a nuisance call, the signaling for the call is captured. The calling party number is captured and any other origination information can be captured and supplied to communications analytics computer system 110. For example, MAP message can be intercepted at SBC 108 and filtering can be used to ascertain A+B numbers.

Network 100 includes a core network that includes telecommunications signaling computer systems such as STP 104 and SBC 108. The core network can include other systems such as SSP 122, MGC 126, MSC/MME 130, EMS 118, and communications analytics computer system 110. The core network does not include computer systems outside of the telecommunications signaling computer systems. For example, an SSP would be considered on the edge of the network and not in the core network.

Figure 2A:
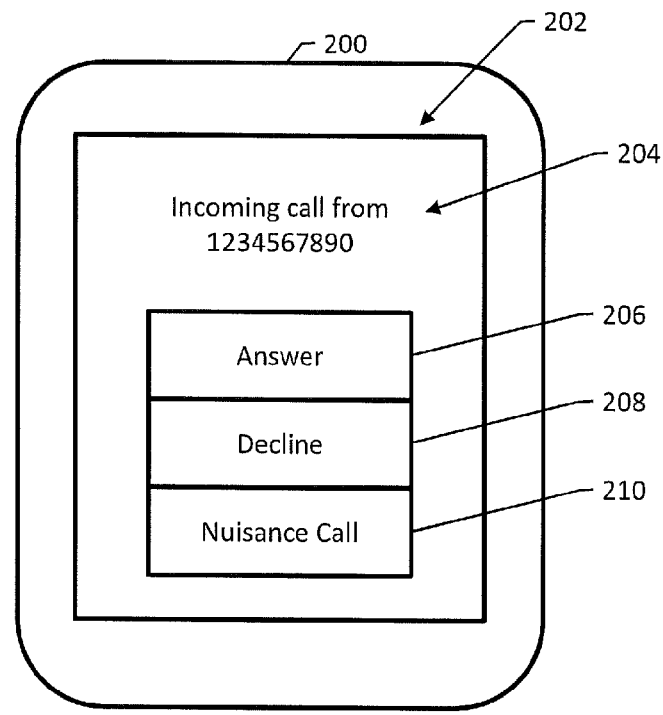
FIG. 2A illustrates a mobile phone displaying an example graphical user interface (GUI) for a subscriber to flag a call as a nuisance call.

FIG. 2A illustrates a mobile phone 200 displaying an example graphical user interface (GUI) 202 for a subscriber to flag a call as a nuisance call. Example GUI 202 includes a display indicator 204 that displays that a call is incoming. Example GUI 202 also includes UI elements, e.g., buttons, including a first button 206 to accept the call, a second button 208 to decline the call, and a third button 210 to flag the call as a nuisance call.

If the subscriber selects button 206, then the call is accepted and the calling party is not flagged for making a nuisance call. If the subscriber selects button 208, then the call is terminated, but the calling party is not flagged for making a nuisance call. The subscriber may select this option where the subscriber is simply busy and may want to accept calls from the calling party later. If the subscriber selects button 210, then the call is terminated and mobile phone 200 sends a message indicating that the subscriber has flagged the call as a nuisance call.

Figure 2B:
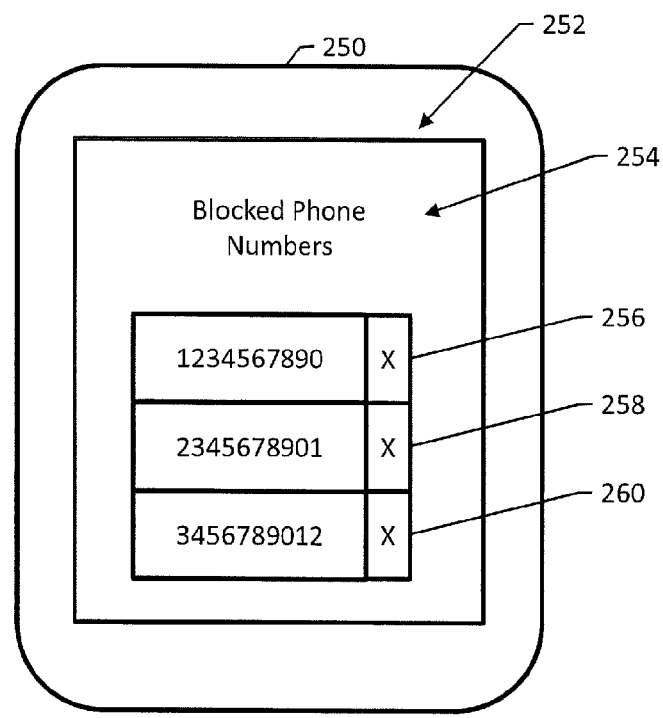
FIG. 2B illustrates a mobile phone displaying an example GUI for a subscriber to retract a call or calling party flagged as a nuisance.

FIG. 2B illustrates a mobile phone 250 displaying an example GUI 252 for a subscriber to retract a call or calling party flagged as a nuisance. For example, a subscriber may enter a URL into a web browser executing on mobile phone 250 for the nuisance call service. The URL may specify, for example, the web address for a server hosted by the subscriber's network operator.

The subscriber may be prompted to authenticate to the nuisance call service. For example, the subscriber may enter a username and password. After authenticating to the nuisance call service, mobile phone 250 displays example GUI 252 to allow the subscriber to remove blocked calling party information.

Example GUI 252 includes a title display 254 indicating that the following list shows calling party numbers that will be blocked in the event that the subscriber is called by any of the numbers on the list. Example GUI 252 includes a list with three lines, line 256, line 258 and line 260. Each line displays a number on the subscriber's block list and a user interface element, e.g., a button, for retracting that number form the subscriber's block list. If the subscriber selects one of the buttons, that number will be removed from the subscriber's block list. Example GUI 252 would then no longer display that number and the calling party from that number could then make phone calls to the subscriber.

Figure 3:
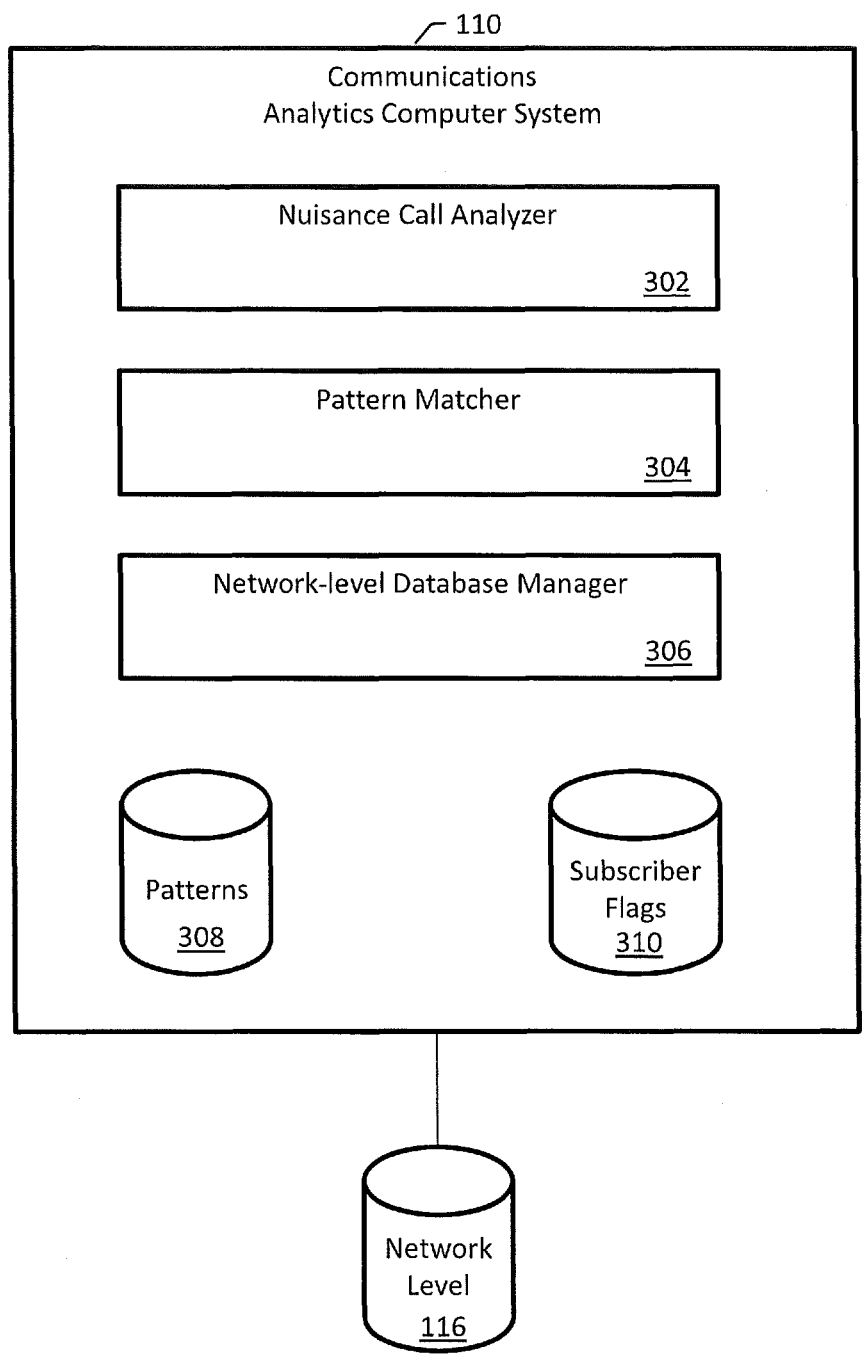
FIG. 3 is a block diagram of an example communications analytics computer system.

FIG. 3 is a block diagram of an example communications analytics computer system 110. Communications analytics computer system 110 can be implemented as a system of one or more processors and one or more non-transitory computer readable mediums storing instructions that, when executed by the processors, cause the processors to identify nuisance calls.

Communications analytics computer system 110 includes a nuisance call analyzer 302, a pattern matcher 304, and a network-level database manager 306. Communications analytics computer system 110 also includes a patterns database 308 and a database 310 of subscriber flags 310.

Communications analytics computer system 110 stores calling party information for calling parties flagged, by subscribers, as making nuisance calls in subscriber flags database 310 and, in some cases, stores subscriber information for flagged calls in subscriber flags database 310. Storing subscriber information can be useful, e.g., for determining the number of unique subscribers that have flagged a calling party as making a nuisance call. A greater number of unique subscribers that have flagged a calling party can be indicative of nuisance calling behavior.

Nuisance call analyzer 302 is configured to execute a nuisance call recognition routine using the data in subscriber flags database 310 and one or more outputs of pattern matcher 304 to determine whether a flagged calling party will stored in network-level nuisance call database 116. When a calling party identifier is stored in network-level nuisance call database 116, a telecommunications signaling computer system can use network-level nuisance call database 116 to block calls from the calling party to subscribers other than those who have flagged the calling party. For example, network-level call blocking can be implemented at the STP 104 or SBC 108 of FIG. 1.

Pattern matcher 304 uses the data stored in subscriber flags database 310 and patterns database 308 to match calling party information with patterns of behavior of network-level nuisance callers. Pattern matcher 304 can use any appropriate pattern matching or machine learning technology. For example, pattern matcher 304 can use machine learning technology, e.g., by using a classifier trained on training data. The training data can be supplied by, e.g., a system administrator and can be based on historical records of nuisance calling as verified by reviewers or other computer systems. Pattern matcher 304 can also, in some cases, use unsupervised learning techniques when training data is unavailable or incomplete. Although pattern matcher 304 is described as performing pattern matching, pattern matcher 304 can also or alternatively be configured to perform pattern recognition or other statistical analysis to identify nuisance calling behavior by calling parties.

To illustrate the operation of pattern matcher 304, consider the following examples. Suppose that patterns database 308 stores a pattern specifying a possible indication of nuisance calling based on a number of calls generated over a time period. The pattern can specify, e.g., a threshold number of calls for the time period.

If a subscriber flags a calling party as a nuisance call, pattern matcher 304 can request, from an appropriate computer system in the network, call origination history for the calling party. If the calling party generates a number of calls greater than the threshold number of calls over a time period in the call origination history, then the pattern matcher 304 can generate an output to nuisance call analyzer 302 indicating a match.

In another example, the pattern can specify a call rate, e.g., by a ratio of number of calls to a time period. In those cases, the pattern matcher 304 can generate an output to nuisance call analyzer 302 indicating a match if the call rate exceeds a threshold call rate, or the pattern matcher 304 can generate an output proportional to the call rate if the call rate exceeds the threshold call rate. In this manner, pattern matcher 304 can indicate the strength of a match in addition to the recognition of a match.

For another example, suppose that patterns database 308 stores a pattern specifying that short calls can be a possible indication of nuisance calling. The pattern can specify, e.g., a threshold length of a call to consider the call a short call and a threshold number of short calls or rate of short calling to trigger a match as a nuisance caller. If a subscriber flags a calling party as a nuisance call, pattern matcher 304 can request, from an appropriate computer system in the network, call origination history for the calling party.

Pattern matcher 304 then determines the number of calls having a length below threshold and compares the number of short calls or rate of short calling to the appropriate threshold. If the number of short calls or rate of short calling exceeds the threshold, pattern matcher 304 can generate an output to nuisance call analyzer 302 indicating a match.

For another example, suppose that patterns database 308 stores a pattern specifying that calls terminated by a called party can be a possible indication of nuisance calling. The pattern can specify, e.g., a threshold number of calls terminated by a called party or a rate of calls terminated by a calling party. The rate can be relative to, e.g., a time period, a total number of originated calls, or a total number of connected calls.

If a subscriber flags a calling party as a nuisance call, pattern matcher 304 can request, from an appropriate computer system in the network, call origination history for the calling party. Pattern matcher 304 then determines the number of calls for the calling party that were terminated by the called party and compares the number of calls or rate of calls to the appropriate threshold. If the number of calls or rate of calls exceeds the appropriate threshold, pattern matcher 304 can generate an output to nuisance call analyzer 302 indicating a match.

For another example, suppose that patterns database 308 stores a pattern specifying that calls made from a calling party to a number of sequential numbers can be a possible indication of nuisance calling. The pattern can specify, e.g., a threshold number of sequential numbers, or other data indicating a pattern of sequential numbers. The pattern of sequential numbers may, in some cases, need not be all sequential, e.g., so that the number of sequential numbers can include gaps or skips but still register as a pattern indicating possible nuisance calling.

If a subscriber flags a calling party as a nuisance call, pattern matcher 304 can request, from an appropriate computer system in the network, call origination history for the calling party. Pattern matcher 304 then determines the number of sequential calls for the calling party and compares the number of sequential calls to a threshold. If the number of sequential calls exceeds the threshold, pattern matcher 304 can generate an output to nuisance call analyzer 302 indicating a match.

Nuisance call analyzer 302 can initiate pattern matcher 304 based on one or more of various flags. In some cases, nuisance call analyzer 302 initiates pattern matcher 304 when a subscriber flags a call as a nuisance call. In some cases, nuisance call analyzer 302 initiates pattern matcher 304 when a threshold number of unique subscribers flag a calling party for nuisance calls.

In some cases, nuisance call analyzer 302 only initiates pattern matcher 304 for a calling party that meets certain threshold indications of a network-level nuisance caller. For example, nuisance call analyzer 302 may not initiate pattern matcher 304 for a calling party that does not originate a threshold number of calls over a certain time period. In this manner, nuisance call analyzer 302 can avoid the computational overhead associated with pattern matching for callers who may be getting blocked by, e.g., friends and family, but are not good candidates for network-level call blocking.

Nuisance call analyzer 302 can determine whether or not to add a calling party to the network-level nuisance call database 116 based on outputs generated by pattern matcher 304. For example, nuisance call analyzer 302 can be configured to add a calling party to the network-level nuisance call database 116 if the calling party matches at least a threshold number of patterns from patterns database 308.

Nuisance call analyzer 302 can be configured to add a calling party to the network-level nuisance call database 116 if the calling party matches certain combinations of patterns from patterns database 308. For example, nuisance call analyzer 302 can be configured to add a calling party to the network-level nuisance call database 116 if the calling party matches both a pattern for short calls and a pattern for terminations by called parties, regardless of whether the calling party matches other patterns. In another example, nuisance call analyzer 302 can be configured to add a calling party to the network-level nuisance call database 116 if the calling party matches a pattern for sequential calling, regardless of whether the called party matches other patterns.

In this manner, pattern matcher 304 may not need to execute pattern matching for a calling party against all of the patterns in patterns database 308. For example, if nuisance call analyzer 302 initiates pattern matcher 304 and pattern matcher 304 returns a match for both short calling and terminations by called parties, then nuisance call analyzer 302 can stop pattern matcher 304 from determining whether the calling party matches a pattern for sequential calling, which can conserve computing resources of communications analytics computer system 110 and cause nuisance call analyzer 302 to block nuisance calling in a shorter amount of time.

In some examples, nuisance call analyzer 302 is configurable on a per-network operator basis. For example, in some cases, a network operator can supply specific patterns for patterns database 308. In some cases, a network operator can select patterns from a repository of available patterns.

In some examples, a network operator can supply a white list of calling party identifiers that are not to be blocked at the network level. Nuisance call analyzer 302 can be configured to not initiate pattern matcher 304 for calling party identifiers on the white list, regardless of whether or not subscribers have flagged the calling party identifiers for nuisance calls, which can conserve computing resources and prevent certain kinds of organizations from having their information stored in network-level nuisance call database 116 for network-level call blocking.

Communications analytics computer system 110 includes a network-level database manager 306 for managing the network-level nuisance call database 116. Network-level database manager 306 can periodically check network-level nuisance call database 116 for records to be removed. For example, network-level database manager 306 can remove records for nuisance callers after a threshold amount of time has passed since those records were added to network-level nuisance call database 116.

Network-level database manager 306 can also be used to remove records for network-level nuisance call database 116 in other circumstances, e.g., when a system administrator determines to remove a record. Reducing the number of records in network-level nuisance call database 116 can be useful, e.g., in reducing the computational overhead of checking the network-level nuisance call database 116 for whether or not to block a call.

In some examples, communications analytics computer system 110 implements various other analytics capabilities in addition to those described in this document. For example, communications analytics computer system 110 can provide network operators with end-to-end, communications-specific analytics functionality for data integration, big data, data warehousing, business intelligence, and advanced analytics such as network assurance analytics.

In some of those systems, communications analytics computer system 110 can provide a dashboard interface providing near-real-time access to analytics data. In those examples, nuisance call analyzer 302 may be integrated with other analytics applications, which can ease integration of nuisance call analyzer 302 and provide a single convenient interface for network operators. The other analytics applications can enable network operators to, e.g., identify network service degradation and outages, predict and prevent network service issues and outages, act on insights to network security, and ensure that multivendor analytics deployments work together properly.

Figure 4:
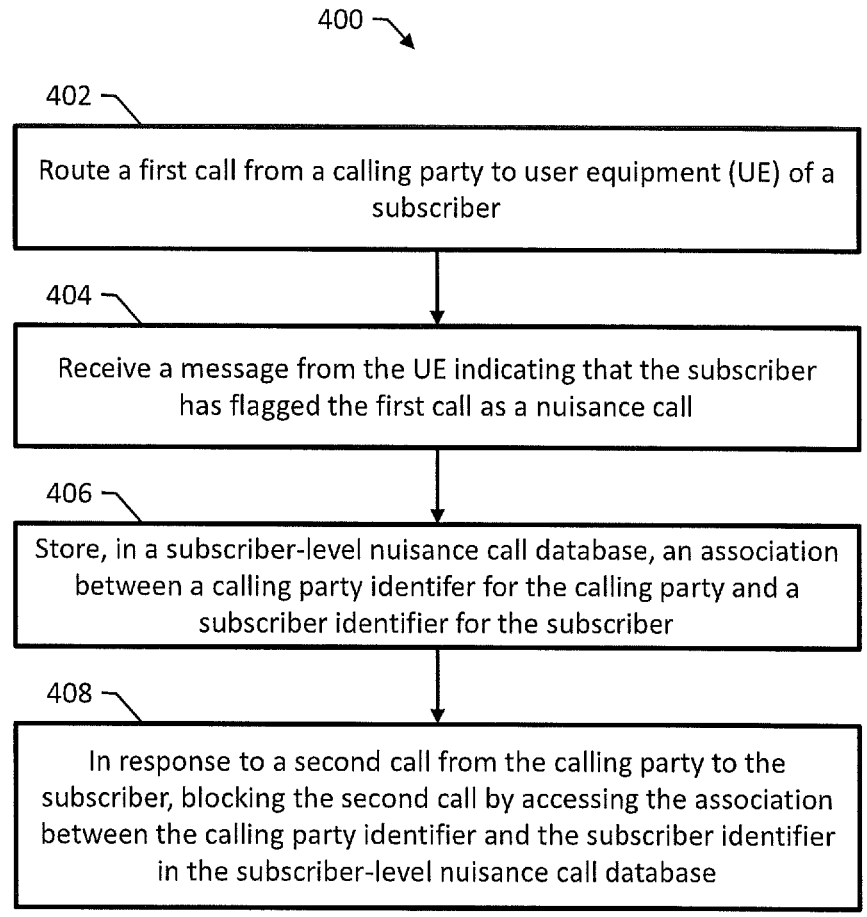
FIG. 4 is a flow diagram of an example method for identifying and blocking nuisance calls.

FIG. 4 is a flow diagram of an example method 400 for identifying and blocking nuisance calls. A telecommunications signaling computer system for routing telecommunications signaling messages in a core network of a telecommunications signaling network performs the method. The telecommunications signaling computer system can be a Signaling Transfer Point (STP), or a Session Border Controller (SBC), or even a Session Router (SR). For example, the nuisance call manager 106 on the SBC 108 of FIG. 1 can perform the method.

The telecommunications signaling computer system routes a first call from a calling party to user equipment (UE) of a subscriber (402). The telecommunications signaling computer system receives a message from the UE indicating that the subscriber has flagged the first call as a nuisance call (404).

For example, the first call can be an IP multimedia system (IMS) call and the telecommunications signaling computer system can a session border controller (SBC). In another example, the first call is a wireless call and the UE is a mobile phone, and routing the first call includes using one or more of mobile application part (MAP), Diameter, and voice over long term evolution (VoLTE). In the wireless call scenario, the telecommunications signaling computer system can receive the message from a mobile application executing on mobile phone that prompts the subscriber with an option to flag a call as a nuisance call during the call or within a threshold amount of time after the call terminates.

If the subscriber accidentally flags a call as a nuisance call or wishes to retract the flag for other reasons, the telecommunications signaling computer system may receive a message from the UE indicating that the subscriber has retracted the flag of the first call and, in response, remove the association between the calling party identifier for the calling party and the subscriber identifier for the subscriber from the subscriber-level nuisance call database.

The telecommunications signaling computer system stores, in a subscriber-level nuisance call database, an association between a calling party identifier for the calling party and a subscriber identifier for the subscriber (406).

In response to a second call from the calling party to the subscriber, the telecommunications signaling computer system blocks the second call using the association between the calling party identifier and the subscriber identifier in the subscriber-level nuisance call database (408). For example, the telecommunications signaling computer system can access the subscriber-level nuisance call database using a query function, or the telecommunications signaling computer system can be provisioned with the appropriate data for carrying out the call blocking without a query function. In some examples, the telecommunications signaling computer system can send a text message, e.g., a short message service (SMS) message, to the UE notifying the subscriber that the second call is being blocked. In some examples, the telecommunications signaling computer system can send a cause code to the calling party indicating why the call is not being routed.

In some examples, the telecommunications signaling computer system supplies the calling party identifier to a communications analytics computer system that stores, as a result of executing a nuisance call analytics routine using the calling party identifier, the calling party identifier in a network-level nuisance call database. For example, the telecommunications signaling computer system can supply the calling party identifier to the communications analytics computer system using an IMS malicious communication identification (MCID) service.

The telecommunications signaling computer system can block calls from the calling party to other subscribers using the network-level nuisance call database. For example, the telecommunications signaling computer system can access the network-level nuisance call database using a query function, or the telecommunications signaling computer system can be provisioned with the appropriate data for carrying out the call blocking without a query function. Supplying the calling party identifier to the communications analytics computer system can include supplying the subscriber identifier to the communications analytics computer system so that the communications analytics computer system determines to store the calling party identifier in the network-level nuisance call database based on both a count of a number of subscribers flagging calls from the calling party as nuisance calls and a positive result from executing a nuisance call pattern matching routine.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The subject matter described herein can be implemented on general purpose computers that are appropriate programmed to become special purpose computers, such as STPs and SBCs, and improves the functionality of telecommunications signaling computer systems by reducing the call volume of nuisance calling. Reducing the call volume of nuisance calling can improve the availability of the network and can otherwise reduce the computational overhead associated with nuisance calls.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method performed by a system of one or more computers, the method comprising:
routing, at a telecommunications signaling computer system for routing telecommunications signaling messages in a core network of a telecommunications signaling network, a first call from a calling party to user equipment (UE) of a subscriber;
receiving, at the telecommunications signaling computer system, a message from the UE indicating that the subscriber has flagged the first call as a nuisance call;
storing, in a subscriber-level nuisance call database, an association between a calling party identifier for the calling party and a subscriber identifier for the subscriber;
in response to a second call from the calling party to the subscriber, blocking, at the telecommunications signaling computer system, the second call using the association between the calling party identifier and the subscriber identifier in the subscriber-level nuisance call database;
supplying the calling party identifier to a communications analytics computer system that stores, as a result of executing a nuisance call analytics routine using the calling party identifier, the calling party identifier in a network-level nuisance call database, wherein supplying the calling party identifier to the communications analytics computer system comprises supplying the subscriber identifier to the communications analytics computer system so that the communications analytics computer system determines to store the calling party identifier in the network-level nuisance call database based on both a count of a number of subscribers flagging calls from the calling party as nuisance calls and a positive result from executing a nuisance call pattern matching routine; and
blocking a plurality of calls from the calling party to a plurality of other subscribers using the network-level nuisance call database.

2. The method of claim 1, wherein executing the nuisance call analytics routine comprises receiving one or more outputs of a pattern matcher implemented using a classifier trained on training data based on historical records of nuisance calling.

3. The method of claim 1, comprising receiving, at the telecommunications signaling computer system, a message from the UE indicating that the subscriber has retracted the flag of the first call and, in response, removing the association between the calling party identifier for the calling party and the subscriber identifier for the subscriber from the subscriber-level nuisance call database.

4. The method of claim 1, wherein the first call is an IP multimedia system (IMS) call and the telecommunications signaling computer system is a session border controller (SBC).

5. The method of claim 4, comprising supplying the calling party identifier to a communications analytics computer system using an IMS malicious communication identification (MCID) service.

6. The method of claim 1, wherein the first call is a wireless call and the UE is a mobile phone, and wherein routing the first call comprises using one or more of mobile application part (MAP), Diameter, and voice over long term evolution (VoLTE).

7. The method of claim 6, wherein receiving the message from the UE indicating that the subscriber has flagged the first call as a nuisance call comprises receiving the message from a mobile application executing on the mobile phone that prompts the subscriber with an option to flag a call as a nuisance call during the call or within a threshold amount of time after the call terminates.

8. The method of claim 6, wherein blocking the second call comprises sending a text message to the mobile phone notifying the subscriber that the second call is being blocked.

9. The method of claim 1, wherein blocking the second call comprises sending a cause code to the calling party indicating why the call is not being routed.

10. A system comprising:
a telecommunications signaling computer system for routing telecommunications signaling messages in a core network of a telecommunications signaling network; and
a nuisance call manager implemented on the telecommunications signaling computer system and configured to perform operations comprising:
routing a first call from a calling party to user equipment (UE) of a subscriber;
receiving a message from the UE indicating that the subscriber has flagged the first call as a nuisance call;
storing, in a subscriber-level nuisance call database, an association between a calling party identifier for the calling party and a subscriber identifier for the subscriber;
in response to a second call from the calling party to the subscriber, blocking the second call using the association between the calling party identifier and the subscriber identifier in the subscriber-level nuisance call database;
supplying the calling party identifier to a communications analytics computer system that stores, as a result of executing a nuisance call analytics routine using the calling party identifier, the calling party identifier in a network-level nuisance call database, wherein supplying the calling party identifier to the communications analytics computer system comprises supplying the subscriber identifier to the communications analytics computer system so that the communications analytics computer system determines to store the calling party identifier in the network-level nuisance call database based on both a count of a number of subscribers flagging calls from the calling party as nuisance calls and a positive result from executing a nuisance call pattern matching routine; and blocking a plurality of calls from the calling party to a plurality of other subscribers using the network-level nuisance call database.

11. The system of claim 10, wherein executing the nuisance call analytics routine comprises receiving one or more outputs of a pattern matcher implemented using a classifier trained on training data based on historical records of nuisance calling.

12. The system of claim 10, the operations comprising receiving, at the telecommunications signaling computer system, a message from the UE indicating that the subscriber has retracted the flag of the first call and, in response, removing the association between the calling party identifier for the calling party and the subscriber identifier for the subscriber from the subscriber-level nuisance call database.

13. The system of claim 10, wherein the first call is an IP multimedia system (IMS) call and the telecommunications signaling computer system is a session border controller (SBC).

14. The system of claim 13, the operations comprising supplying the calling party identifier to a communications analytics computer system using an IMS malicious communication identification (MCID) service.

15. The system of claim 10, wherein the first call is a wireless call and the UE is a mobile phone, and wherein routing the first call comprises using one or more of mobile application part (MAP), Diameter, and voice over long term evolution (VoLTE).

16. The system of claim 15, wherein receiving the message from the UE indicating that the subscriber has flagged the first call as a nuisance call comprises receiving the message from a mobile application executing on the mobile phone that prompts the subscriber with an option to flag a call as a nuisance call during the call or within a threshold amount of time after the call terminates.

17. The system of claim 15, wherein blocking the second call comprises sending a text message to the mobile phone notifying the subscriber that the second call is being blocked.

18. The system of claim 10, wherein blocking the second call comprises sending a cause code to the calling party indicating why the call is not being routed.

19. A non-transitory computer readable medium storing executable instructions that when executed by one or more computers cause the one or more computers to perform operations comprising:
routing, at a telecommunications signaling computer system for routing telecommunications signaling messages in a core network of a telecommunications signaling network, a first call from a calling party to user equipment (UE) of a subscriber;
receiving, at the telecommunications signaling computer system, a message from the UE indicating that the subscriber has flagged the first call as a nuisance call;
storing, in a subscriber-level nuisance call database, an association between a calling party identifier for the calling party and a subscriber identifier for the subscriber;
in response to a second call from the calling party to the subscriber, blocking, at the telecommunications signaling computer system, the second call using the association between the calling party identifier and the subscriber identifier in the subscriber-level nuisance call database;
supplying the calling party identifier to a communications analytics computer system that stores, as a result of executing a nuisance call analytics routine using the calling party identifier, the calling party identifier in a network-level nuisance call database, wherein supplying the calling party identifier to the communications analytics computer system comprises supplying the subscriber identifier to the communications analytics computer system so that the communications analytics computer system determines to store the calling party identifier in the network-level nuisance call database based on both a count of a number of subscribers flagging calls from the calling party as nuisance calls and a positive result from executing a nuisance call pattern matching routine; and blocking a plurality of calls from the calling party to a plurality of other subscribers using the network-level nuisance call database.

\* \* \* \* \*

UNITED STATES PATENT AND TRADEMARK OFFICE
CERTIFICATE OF CORRECTION

PATENT NO. : 9,706,048 B2
APPLICATION NO. : 14/960322
DATED : July 11, 2017
INVENTOR(S) : Russell It is certified that error appears in the above-identified patent and that said Letters Patent is hereby corrected as shown below:

In the Drawings

On sheet 1 of 4, in FIG. 1, under Reference Numeral 114, Line 1, delete "Suscriber" and insert -- Subscriber --, therefor.

On sheet 4 of 4, in FIG. 4, under Reference Numeral 406, Line 2, delete "identifer" and insert -- identifier --, therefor.

In the Specification

In Column 7, Line 4, delete "user" and insert -- user. --, therefor.

Signed and Sealed this
Twentieth Day of February, 2018

Andrei Iancu
*Director of the United States Patent and Trademark Office*